(12) United States Patent  
Shmilovich et al.

(10) Patent No.: US 8,087,618 B1
(45) Date of Patent: Jan. 3, 2012

(54) PROPULSION SYSTEM AND METHOD FOR EFFICIENT LIFT GENERATION

(75) Inventors: Arvin Shmilovich, Huntington Beach, CA (US); Yoram Yadlin, Irvine, CA (US); Roger W. Clark, Huntington Beach, CA (US); Robert D. Gregg, III, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 393 days.

(21) Appl. No.: 12/500,419

(22) Filed: Jul. 9, 2009

Related U.S. Application Data

(63) Continuation-in-part of application No. 11/927,257, filed on Oct. 29, 2007, now Pat. No. 7,823,840.

(51) Int. Cl.
*B64C 3/50* (2006.01)

(52) U.S. Cl. ........ 244/215; 244/207; 244/201; 244/213; 244/198

(58) Field of Classification Search ............ 244/198, 244/201, 207, 213, 215
See application file for complete search history.

(56) References Cited

U.S. PATENT DOCUMENTS

| | | | |
|---|---|---|---|
| 3,841,588 A * | 10/1974 | Arnold et al. | 244/207 |
| 3,887,146 A * | 6/1975 | Bright | 244/12.1 |
| 3,893,638 A * | 7/1975 | Kelley | 244/12.5 |
| 4,019,696 A * | 4/1977 | Hirt et al. | 244/200.1 |
| 4,326,686 A | 4/1982 | Runge | |
| 4,391,424 A * | 7/1983 | Bartoe, Jr. | 244/207 |
| 4,392,621 A * | 7/1983 | Viets | 244/12.5 |
| 4,426,054 A | 1/1984 | Wang | |
| 4,447,028 A * | 5/1984 | Wang | 244/212 |
| 4,600,172 A * | 7/1986 | Loth | 244/207 |
| 4,845,939 A | 7/1989 | Jordan et al. | |
| 5,806,808 A * | 9/1998 | O'Neil | 244/213 |
| 6,109,565 A * | 8/2000 | King, Sr. | 244/207 |
| 6,682,021 B1 * | 1/2004 | Truax et al. | 244/201 |
| 6,926,229 B2 * | 8/2005 | Cummings et al. | 244/12.5 |
| 2005/0184196 A1 | 8/2005 | Shmilovich et al. | |
| 2006/0102801 A1 * | 5/2006 | Manley | 244/208 |

FOREIGN PATENT DOCUMENTS

WO PCT/US2008/076857 9/2008

OTHER PUBLICATIONS

"YC-14 Advanced Medium STOL Transport (AMST)" http://www.globalsecurity.org/militalyisystems/aircraft/c-14.htm.

* cited by examiner

*Primary Examiner* — Tien Dinh
*Assistant Examiner* — Justin Benedik
(74) *Attorney, Agent, or Firm* — Tung & Associates

(57) ABSTRACT

A propulsion system for an aircraft includes an airfoil, an engine having an engine cowling carried by the airfoil and configured to produce exhaust gases that are predominantly directed toward an aft end of the airfoil by the engine cowling as engine exhaust, a propulsion flap carried by the airfoil and disposed aft of the engine cowling and a plurality of exhaust ejection orifices provided in the propulsion flap and adapted to receive at least a portion of the exhaust gases from the engine cowling.

20 Claims, 7 Drawing Sheets

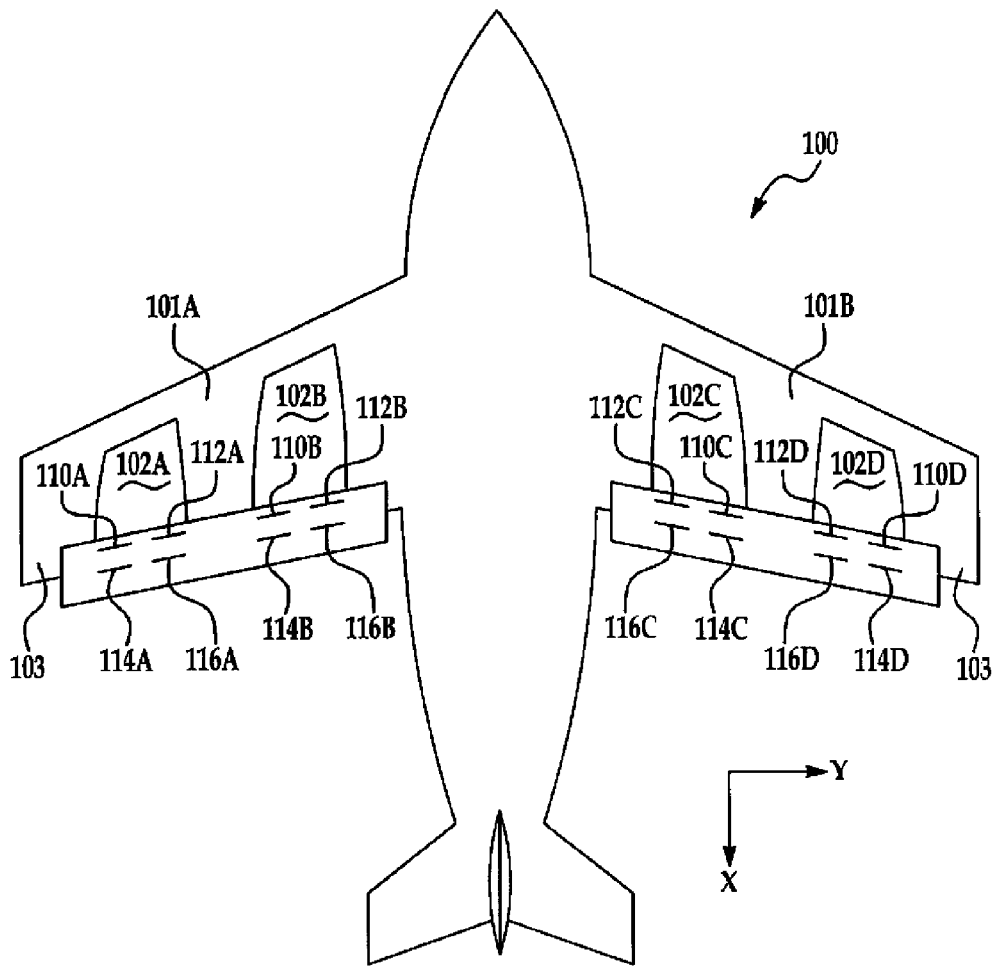
FIG. 1
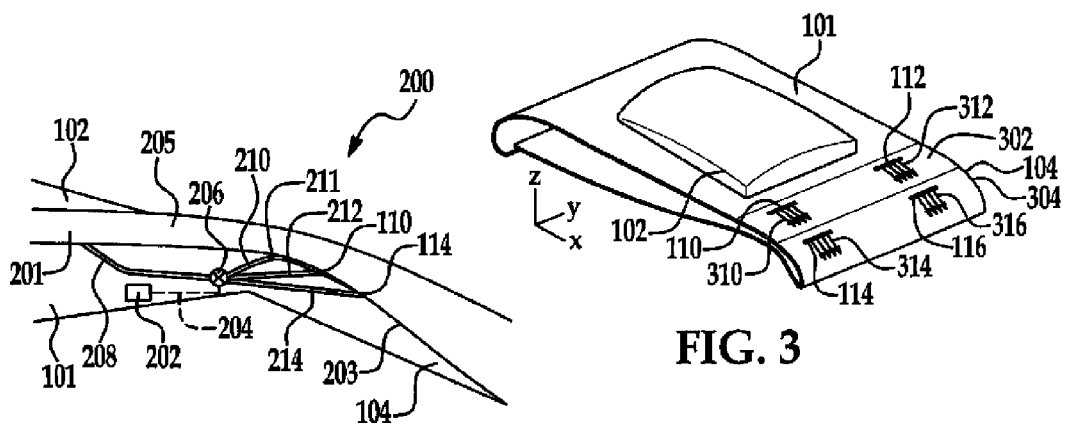
FIG. 2
FIG. 3

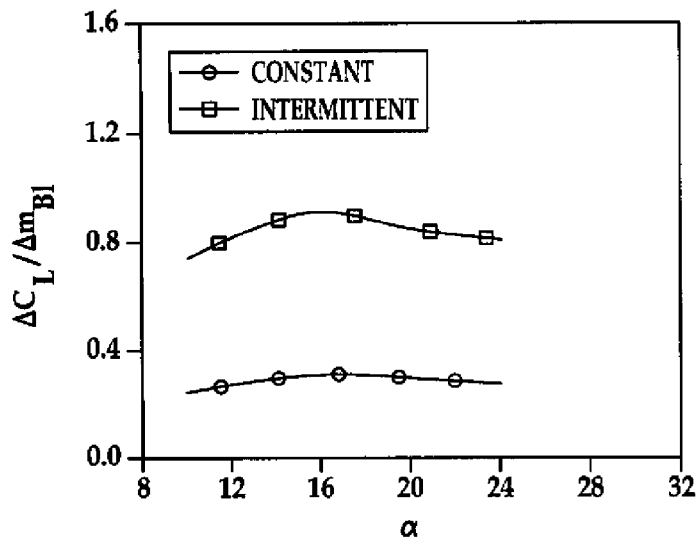

FIG. 16

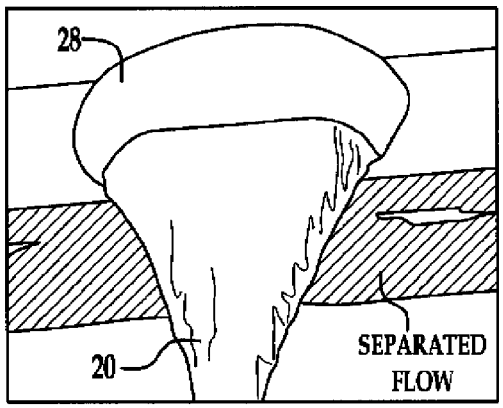

FIG. 17A

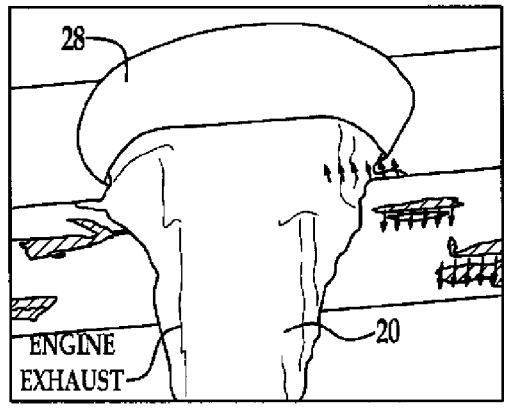

FIG. 17B

```
1700
 ↓
┌─────────────────────────────────────────────────────────┐
│ PROVIDE PROPULSION FLAP HAVING CONVEX EXHAUST FLOW      │─1702
│ SURFACE AND EXHAUST EJECTION ORIFICES IN EXHAUST FLOW   │
│ SURFACE ON FIRST AND SECOND SIDES OF PROPULSION FLAP    │
└─────────────────────────────────────────────────────────┘
                              ↓
          ┌─────────────────────────────────────┐
          │ PROVIDE FLOW OF ENGINE EXHAUST      │─1704
          └─────────────────────────────────────┘
                              ↓
┌─────────────────────────────────────────────────────────┐
│ DISCHARGE ENGINE EXHAUST THROUGH EXHAUST EJECTION       │─1706
│ ORIFICES ON THE FIRST AND SECOND SIDES OF PROPULSION FLAP│
└─────────────────────────────────────────────────────────┘
```

FIG. 18

PROPULSION SYSTEM AND METHOD FOR EFFICIENT LIFT GENERATION

CROSS-REFERENCE TO RELATED APPLICATIONS

This application is a continuation-in-part application and incorporates by reference in its entirety application Ser. No. 11/927,257, filed Oct. 29, 2007 now U.S. Pat. No. 7,823,840 and entitled "Systems and Methods for control of Engine Exhaust Flow".

TECHNICAL FIELD

The present disclosure generally relates to a propulsion system and method which increases engine-powered lift produced along a surface of an aircraft through control of engine exhaust.

BACKGROUND

Scientists and engineers continue to seek improvements in all areas of aircraft performance. Recent military campaigns, for example, have demonstrated an increased need for improved short takeoff and landing (STOL) performance to allow aircraft to operate in environments where sophisticated airports and other landing facilities may not be available. In particular, it is desirable to create aircraft that are able to takeoff and/or land even on relatively short runways.

One way to improve STOL performance is to increase the amount of lift produced along the airfoil surfaces of the aircraft. By increasing the amount of lift produced by each wing, for example, the aircraft can become airborne at a lower airspeed, thereby reducing the amount of runway needed for takeoff. Various aircraft designs have attempted to maximize the amount of lift produced along an airfoil surface through exploitation of the well-known Coanda Effect. In many of these designs, air moving over the wing can be "bent down" towards the ground using flaps and a jet blowing over a curved surface to increase the amount of lift produced. Aircraft that have successfully exploited the Coanda Effect for STOL purposes include the Boeing YC-14 as well as various unmanned aerial vehicles (UAVs) and the like. Nevertheless, there remains a desire for aircraft designs with even better STOL performance.

SUMMARY

The present disclosure is generally directed to a propulsion system for an aircraft. In some embodiments, the propulsion system may include an airfoil; an engine having an engine cowling carried by the airfoil and configured to produce exhaust gases that are predominantly directed toward an aft end of the airfoil by the engine cowling as engine exhaust; a propulsion flap carried by the airfoil and disposed aft of the engine cowling; and a plurality of exhaust ejection orifices provided in the propulsion flap and adapted to receive at least a portion of the exhaust gases from the engine cowling.

In some embodiments, the propulsion system may include an airfoil; an engine having an engine cowling carried by the airfoil and configured to produce exhaust gases that are predominantly directed toward an aft end of the airfoil by the engine cowling as engine exhaust; a generally rectangular propulsion flap carried by the airfoil and disposed aft of the engine cowling; a plurality of pairs of spaced-apart exhaust ejection orifices provided in the propulsion flap and adapted to receive at least a portion of the exhaust gases from the engine cowling; and a controller configured to facilitate intermittent flow of the at least a portion of the exhaust gases from the plurality of pairs of exhaust ejection orifices.

The present disclosure is further generally directed to a method for increasing lift produced along a surface of an airfoil of an aircraft having an airfoil and an engine having an engine cowling provided on the airfoil. An illustrative embodiment of the method may include a propulsion flap which, when deflected, it produces a generally convex upper surface aft of the engine cowling and a plurality of exhaust ejection orifices provided in the exhaust flow surface; operating the engine to thereby produce exhaust gases; and ejecting at least a portion of the exhaust gases through the exhaust ejection orifices of the propulsion flap.

In some embodiments, the propulsion system may be configured for providing lift to an aircraft and may include an aircraft wing; an engine having an engine cowling carried by the aircraft wing and configured to produce exhaust gases that are predominantly directed toward an aft end of the aircraft wing by the engine cowling as engine exhaust; a rear wing flap extendable from the aircraft wing; a generally rectangular propulsion flap disposed aft of the engine cowling and having a flap hinge line extending along the rear wing flap, a pair of spaced-apart flap side edges extending from the flap hinge line, a flap trailing edge extending between the flap side edges, a flap curvature between the flap hinge line and the flap trailing edge and a convex exhaust flow surface defined by the flap curvature; a plurality of exhaust ducts embedded in the propulsion flap and disposed in fluid communication with the engine cowling; a plurality of exhaust flow valves communicating with the plurality of exhaust ducts, respectively; a pair of proximal exhaust ejection orifices, a pair of trailing exhaust ejection orifices and a pair of middle exhaust ejection orifices provided in the exhaust flow surface of the propulsion flap and disposed in fluid communication with the plurality of exhaust ducts; and a controller connected to the plurality of exhaust flow valves and configured to facilitate intermittent flow of at least a portion of the engine exhaust from the pair of proximal exhaust ejection orifices, the pair of trailing exhaust ejection orifices and the pair of middle exhaust ejection orifices.

The present disclosure is further generally directed to a method for increasing lift produced along a surface of an aircraft wing of an aircraft having an aircraft wing, an engine having an engine cowling provided on the aircraft wing and a rear wing flap extendable from the aircraft wing. In some embodiments the method may include providing a propulsion flap generally aft of the engine cowling and comprising a flap hinge line extending along the rear wing flap; a pair of spaced-apart flap side edges extending from the flap hinge line; a flap trailing edge extending between the flap side edges; a flap curvature between the flap hinge line and the flap trailing edge; a convex exhaust flow surface defined by the flap curvature; a plurality of pairs of exhaust ejection orifices provided in the exhaust flow surface; a plurality of exhaust ducts embedded in the propulsion flap and establishing fluid communication between the engine cowling and the plurality of pairs of exhaust ejection orifices; a plurality of exhaust flow valves communicating with the plurality of exhaust ducts, respectively; and a controller connected to the plurality of exhaust flow valves; operating the engine to thereby produce exhaust gases; and operating the controller to intermittently eject at least a portion of the exhaust gases through the exhaust ejection orifices of the propulsion flap by actuation of the plurality of exhaust flow valves.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Various embodiments will hereinafter be described in conjunction with the following drawing figures, wherein like numerals denote like elements, and FIG. 1 is a top view of an exemplary aircraft with improved lift capabilities produced through control of engine exhaust flow;

FIG. 2 is a side view of a cut through an exemplary system for controlling engine exhaust flow in an aircraft;

FIG. 3 is a perspective view of an exemplary system for controlling engine exhaust flow along an airfoil;

FIG. 16 is a graph which illustrates efficiencies attained with various actuation modes in terms of unit lift increment per unit of engine bleed;

FIG. 17A is a perspective rear view showing flow structure for the baseline case;

FIG. 17B is a perspective rear view showing flow structure for the intermittent actuation case;

FIG. 18 is a flow diagram of an illustrative embodiment of the propulsion method for efficient lift generation;

DETAILED DESCRIPTION

Figure 4:
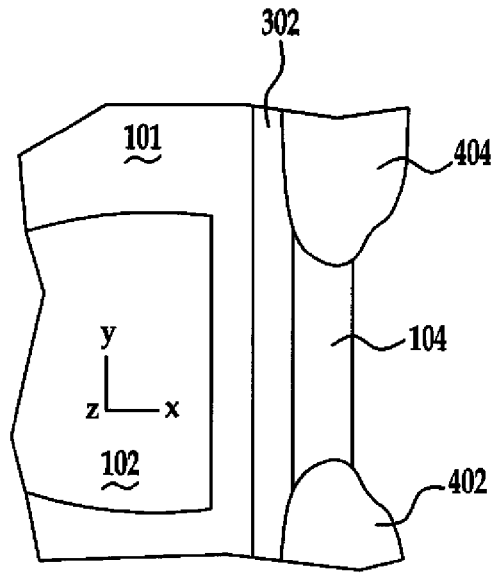
FIGS. 4-7 are top-down views of exemplary implementations of engine exhaust flow systems.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Generally speaking, the amount of lift produced along a surface of an aircraft can be increased by improving the flow of air over the surface. Especially in the case of STOL aircraft designed to exploit the Coanda Effect, lift can be reduced by three-dimensional effects whereby air flowing across an airfoil detaches from the surface of the aircraft. By restricting the three-dimensional effects of airflow and instead encouraging two-dimensional flow across the surface, lift produced by Coanda airflows along the surface can be increased.

One way to reduce three-dimensional airflow along a surface of an aircraft is to provide a system of ducts that direct streams of compressed fluid (e.g. engine exhaust or other compressed air) from the engine to appropriate locations on the surface of an airfoil. The ducted streams suitably suppress airflow separation and/or otherwise encourage airflow in a two-dimensional manner across a wider section of the airfoil surface. Such ducts can be deployed at least during takeoff and/or landing to provide augmented lift, and may be switched off during level flight and/or at other times as appropriate. By reducing three-dimensional effects of airflow over the airfoil surface while the ducts are active, the Coanda Effect produced on the surface of an airfoil can be increased, thereby resulting in increased lift and improved STOL performance for the aircraft.

With reference now to FIG. 1, an exemplary aircraft 100 suitably includes one or more airfoils 101A-B that produces lift in response to fluid flow across the surface of the airfoil. In various embodiments, aircraft 100 exploits Coanda Effects produced along the airfoils 101A-B for improved STOL performance. To that end, aircraft 100 may include any number of engines that produce exhaust gases expelled along the surfaces of airfoils 101A-B toward the rear end of aircraft 100. Engine exhaust may emanate from engine cowlings 102A-D, for example, which suitably extends outwardly from the surfaces of airfoils 101A-B. Engine exhaust may alternately be applied to the airfoils 101A-B from sources other than cowlings 102A-D, such as a nozzle or other structure attached to the engine.

The exhaust gases may be directed along a surface of a flap 103 or other control surface associated with airfoil 101A-B as appropriate. In various embodiments, flaps 103 are extended during takeoffs and/or landings that demand STOL performance, and engine exhaust from cowlings 102A-D suitably flows across the surfaces of flaps 103 to provide increased lift using Coanda Effects. In many embodiments, aircraft 100 is designed to exploit "upper surface blowing" (USB) principles wherein engine exhaust is directed along an upper surface of a wing, flap and/or other airfoil structure to maximize lift produced. One example of an aircraft design that exploits USB effects to produce increased lift across a wing/flap structure is described in U.S. Pat. No. 6,926,229, although many other designs could be equivalently applied.

In various embodiments, two-dimensional airflow across the surface of airfoils 101A-B is encouraged through the use of ducts that conduct compressed fluid from an engine or other source to the surface of the airfoil. By properly injecting airflow along the surface of airfoil 101A-B, engine exhaust is encouraged to efficiently turn along the surface of the airfoil (rather than peeling away from the surface), thereby increasing Coanda Effects and augmenting total lift.

The various ducts contained within any airfoil 101 may be arranged in any manner. Ducts may originate within any portion of an engine, for example, such as the engine compressor or engine fan, or from any other source of bleed air and/or exhaust. Any number of ducts may be provided, and embodiments with multiple ducts may arrange and/or group the ducts in any manner desired to achieve desired results. In many embodiments, the various ducts terminate at a slot or other opening in airfoil 101. In practice, the slots may simply be implemented as small openings in the airfoil 101 that inject compressed fluid when actuated. Slots 110A-D, 112A-D, 114A-D, 116A-D in airfoils 101A-B, for example, can be arranged in any manner and at any size to distribute fluid conducted by the ducts. In the exemplary aircraft 100 shown in FIG. 1, each engine cowling 102 has four slots 110, 112, 114, 116 that are capable of directing compressed fluid as desired, and as described more fully below. In the embodiment shown in FIG. 1, slots 110-116 are arranged with respect to the left and right edges of cowlings 102 in order to impart momentum in a manner that locally suppresses flow separation along the surfaces of flaps 104A-B, thereby postponing edge vortices that may otherwise form. Alternate embodiments may contain different slot arrangements that omit or modify any of the slots shown in the figure. Slots could be alternately organized such that the spacing between slots is variable (e.g. with the distance between slots increasing toward the trailing edge of flap 104 or airfoil 101), for example, or such any number of slots are arranged in any direction, such as parallel or at an angle to the exhaust flow. Slots 114A-D and 116A-D in FIG. 1, for example, could be alternately designed to be angled at least partially away from the exhaust plume (e.g. at an angle of 20-40 degrees or so) to direct exhaust airflow across a wider section of flap 104. Alternately, such slots could be oriented to be approximately parallel or perpendicular to the exhaust flow. Moreover, the fluid emanating from the slots could be differently oriented (e.g. in any direction perpendicular to the primary axis of the slot, or at any angle). Again, other embodiments may be arranged in any manner.

In practice, then, aircraft 100 produces enhanced lift through exploitation of Coanda Effects produced along a surface of airfoils 101A-B as appropriate. One or more aircraft engines are operated to produce exhaust gases that can be directed along a surface of an airfoil to produce or augment lift. While the majority of the exhaust plume is generally directed with a cowling, nozzle and/or other structure, a portion of exhaust or other compressed fluid emanating from the engine can be ducted to slots 110, 112, 114 and/or 116 as desired to encourage two dimensional flow along the surface of airfoil 101. The fluid ducts may be manually or pre-programmed to automatically activate at any portion of flight; for example, the ducts may be active during takeoffs, landings, and/or other times that flaps 104 or other control surfaces are deployed. In such embodiments, the various ducts may be deactivated during level flight or other periods when enhanced lift is not needed or desired. Further, jets through the slot openings might be adjusted in order to control the injection of fluid at critical locations, depending on flight conditions, engine power setting and/or flap deflection. For example, fluid injection might be administered at different locations (i.e., through segments of slots) and at different intensities and orientations for takeoff, approach to landing, and landing.

FIG. 2 shows an exemplary duct system 200 capable of providing streams of compressed fluid from an aircraft engine assembly 201 to an outer surface 203 of a wing 101, flap 104 and/or other airfoil as appropriate. As noted above, compressed air, exhaust 205 or other fluid is tapped from a compressor, fan or other portion of engine 101 in one or more input ducts 208. Using a control valve 206, fluid can be allowed or disallowed to flow through ducts 210, 212 and/or 214 as appropriate. Valve 206 may be any sort of mechanically and/or electrically controlled valve capable of being opened, closed and/or otherwise actuated in response to a control signal 204 provided by any sort of control circuitry 202. In various embodiments, control circuitry 202 is a conventional microcontroller circuit that contains suitable hardware, software and/or firmware logic capable of directing the actuation of valve 206 to transmit compressed fluid on the surface 203 of the airfoil 101 as appropriate.

Ducts 208, 210, 212, 214 may be arranged in any manner. In the exemplary embodiment shown in FIG. 2, fluid from a single duct 208 is provided to multiple output ducts 210, 212, 214 by a single valve structure 206. In practice, the number of input and/or output ducts may vary, and may be interconnected in any manner using any number of valves or other inter-connecting structures. As noted above, fluid may be input into duct 208 from any source associated with engine 201. Compressed air could be obtained from an engine compressor or fan, for example, and/or exhaust 205 could be obtained as appropriate. In the exemplary embodiments shown in FIG. 2, a relatively small amount (e.g. on the order of 1-2% or so) of engine exhaust is extracted from the engine exhaust duct and directed within the wing or other airfoil 101 to a flap 104. In other exemplary embodiments, engine fan flow could be used as a fluidic source for controlling engine exhaust; such embodiments may provide an added advantage in that fan bleed can provide cooling of flap and/or airfoil surfaces in addition to enhanced aerodynamic performance. In still other embodiments, compressed air is obtained from any bleed air source, such as a source commonly used to provide bleed air for de-icing, cabin pressurization, pneumatic actuation and/or any other purpose. As such, valve 206 and/or ducts 208, 210, 212, 214 may be implemented using conventional "bleed air" components commonly used for other purposes on many conventional aircraft.

In a conventional STOL application, then, exhaust 205 generated by engine 201 is primarily applied to a surface 203 of a flap 104 and/or other airfoil 101 using a nozzle, cowling 102 and/or other structures as appropriate. As the exhaust curves along surface 203 in accordance with the Coanda Effect, lift is produced. By placing valve structure 206 into a proper position or state, compressed fluid from engine 201 is applied through ducts 208, 210, 212 and/or 214 to slots 110, 114 and/or 211 to prevent exhaust 205 from peeling away from surface 203, which would otherwise reduce the amount of lift produced. As a result, actuation of valve 206 can result in selective enhancement of lift produced with airfoil 101 through improved Coanda Effects of exhaust flowing across surface 203.

FIG. 3 shows a perspective view of an exemplary airfoil 101 whereby exhaust emanating from the trailing (aft) edge of cowling 102 could be encouraged to follow the sudden curved region 302 produced due to the downwards deflection of the flap 104 and flap trailing edge 304 through the application of slots 110, 112, 114 and 116. The curved region 302 is sometimes referred to as hinge line. In this embodiment, slots 110 and 112 are formed in the curved region 302, whereas slots 114 and 116 are formed in the mid flap region as appropriate. Slots 110, 112, 114, 116 may be aligned or angled in any manner to affect the exhaust plume emanating from cowling 102. The jets of compressed fluid passing through slots 110, 112, 114, 116 are represented in FIG. 3 with vectors 310, 312, 314, 316, respectively. While FIG. 3 shows each of the slots generally aligned to be parallel to and downstream from the edges of cowling 102, other embodiments (such as that shown in FIG. 1) may align some or all of the slots differently.

Figure 5:
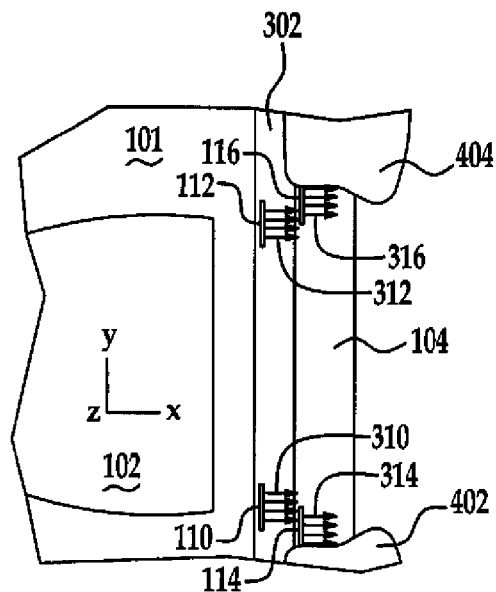
Figure 6:
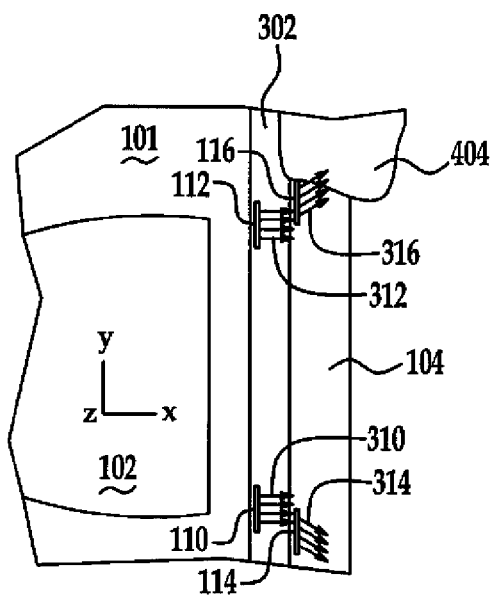
Figure 7:
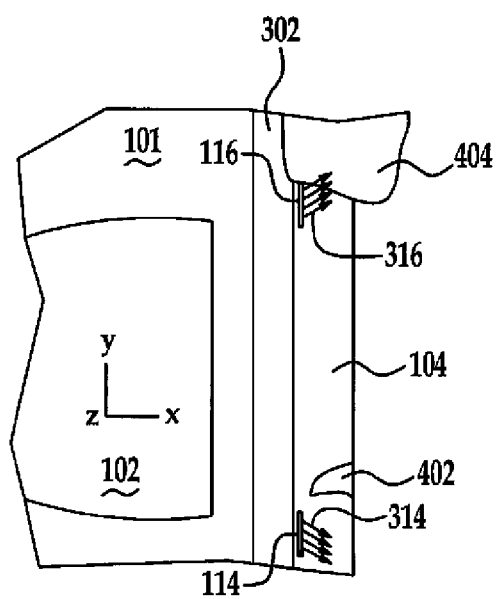

The benefits provided through the application of compressed fluid on the surface of the airfoil can be shown with regard to FIGS. 4-7. FIG. 4, for example, shows the top view of a simulated flowfield with pockets of flow separation 402, 404 in an exemplary embodiment wherein no injected airflow is provided. Here the engine exhaust emanates from the engine cowl 102 and it is directed to the right (as the figure is oriented). By comparing the flow separation bubbles 402, 404 to their counterparts in FIGS. 5-7, the benefits of injected air can be readily noticed. FIG. 5, for example, shows one embodiment wherein four injection slots 110, 112, 114, 116 are actuated to encourage flow attachment to the flap 104 through application of jets 310, 312, 314, 316. As a result of this pattern, smaller separated flow pockets 402, 404 are pushed away from the exhaust plume that is produced aft of cowling 102. In the embodiment of FIG. 5, slots 110 and 114 are associated with the left edge of cowling 102, and slots 112 and 116 are associated with the right edge. Further, slots 110 and 112 may be displaced on a leading edge of a flap 104 or other structure, whereas slots 114 and 116 may be located on the trailing edge, or otherwise located "downstream" of slots 110, 112. Slots 114 and 116 are configured in FIG. 6 to eject radially outward from the edge of cowling 102 (in comparison to groups 110 and 112, respectively) although other embodiments could exhibit more or less alignment between slots. FIG. 7 similarly shows slots 114, 116 and resulting vectors 314, 316 in an alternate configuration without slots 110 and 112.

By comparing the positions and sizes of the flow separation pockets 402 and 404 in FIG. 4 with those in FIG. 5, it is apparent that the injected airflow represented by vectors 310, 312, 314 and 316 enhances flow attachment, thereby resulting in mild three dimensional effects and enhanced streamlining of the engine exhaust 205 around the flap surface 203. Also, engine exhaust is allowed to spread across a wider section of airfoil 101/flap 104, thereby augmenting lift generated by Coanda Effects. Flow separation may be further suppressed by angling some or all of the injected airflow outwardly away from the exhaust plume, as evidenced by the separated airflows 402, 404 shown in FIG. 6. In the FIG. 6 embodiment, injected airflows 314, 316 are directed outwardly at an angle of approximately 30 degrees with respect to the downstream direction of the exhaust airflow, thereby reducing separation bubbles 402, 404. As noted above, alternate embodiments may provide different numbers, groupings and/or arrangements of injected airflows. FIG. 7, for example, omits slots 110 and 112 shown in the other figures to reduce sizes of separation pockets 402, 404 in comparison to the FIG. 4 embodiment. Many other arrangements and layouts could be created in a vast array of equivalent embodiments. For example, slots could extend from edge to edge of cowling 102 in a direction that is more or less parallel to the trailing edge line of flap 104. Again, some or all of the injected airflows may be manually or automatically activated and deactivated during flight to adjust aircraft performance as desired.

Referring next to FIGS. 8-17 of the drawings, an illustrative embodiment of a propulsion system for efficient lift generation, hereinafter propulsion system, is generally indicated by reference numeral 1 in FIGS. 8-12. The propulsion system 1 may include a propulsion flap 2 which is provided on an airfoil such as an aircraft wing of an aircraft 24 generally aft or downstream of an engine cowling 28 of a jet engine. The propulsion flap 2 may be an integral part of the rear wing flap 26 of the aircraft wing 25. In some embodiments, the propulsion flap may have a generally rectangular configuration with a flap hinge line 4 through which the propulsion flap 2 is pivotally attached to the rear wing flap 26; a flap trailing edge 5 which is opposite the flap hinge line 4; and a pair of spaced-apart flap side edges 3 which extend between the flap hinge line 4 and the flap trailing edge 5. The propulsion flap 2 may have an exhaust flow surface 7. A flap curvature 6 may be provided transversely in the propulsion flap 2 between the flap hinge line 4 and the flap trailing edge 5. The flap curvature 6 may impart a generally downward trajectory to the exhaust plume (not shown) above flow surface 7 from the flap hinge line 4 to the flap trailing edge 5 and a generally convex configuration to the exhaust flow surface 7.

Figure 8:
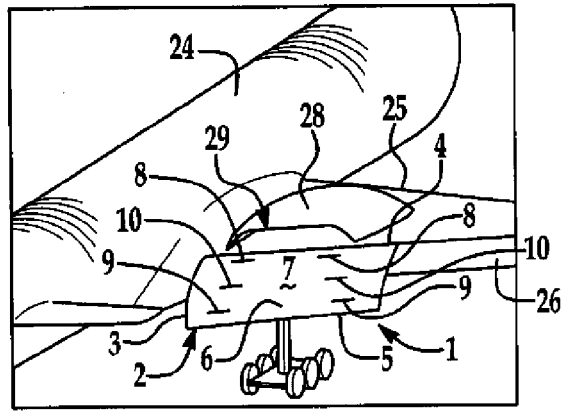
FIG. 8 is a rear perspective view of an illustrative embodiment of a propulsion system for efficient lift generation.
Figure 9:
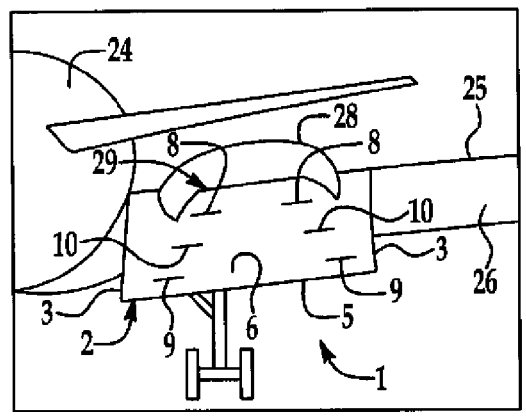
FIG. 9 is a rear view of an illustrative embodiment of a propulsion system for efficient lift generation.
Figure 10:
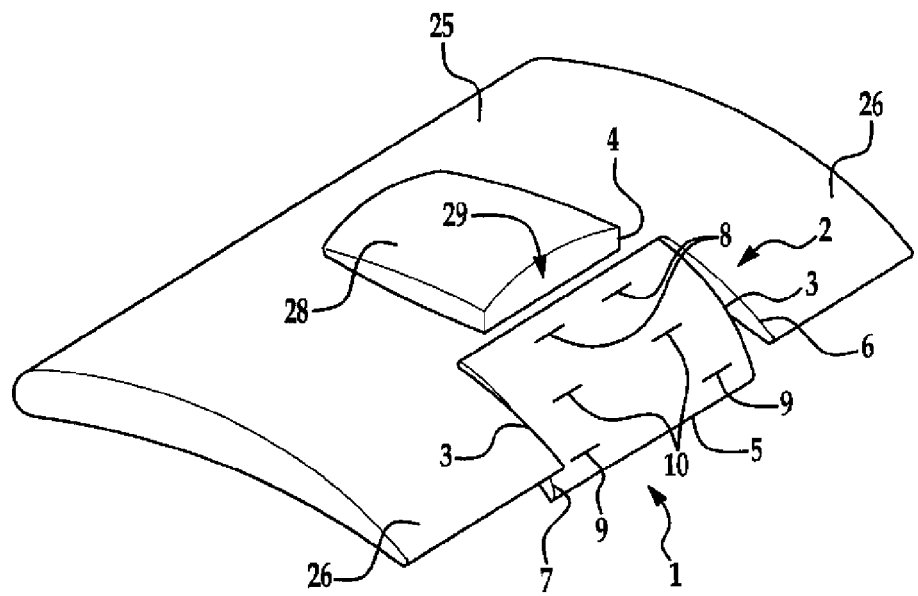
FIG. 10 is a perspective view of an illustrative embodiment of the propulsion system for efficient lift generation of an aircraft.

As illustrated in FIGS. 8, 9 and 10, the flap hinge line 4 of the propulsion flap 2 may be disposed just aft or downstream with respect to a cowling outlet 29 of the engine cowling 28. Multiple exhaust ejection orifices 8, 9, 10 may be provided in the exhaust flow surface 7 of the propulsion flap 2. Each of the exhaust ejection orifices 8, 9, 10 may have a slit or slot shape. In some embodiments, multiple pairs of exhaust ejection orifices 8, 9, 10 may be provided in the exhaust flow surface 7 of the propulsion flap 2. A proximal pair of spaced-apart exhaust ejection orifices 8 may be disposed generally proximate to the flap hinge line 4. A trailing pair of spaced-apart exhaust ejection orifices 9 may be disposed generally proximate to the flap trailing edge 5. A middle pair of spaced-apart exhaust ejection orifices 10 may be disposed between the proximal pair of exhaust ejection orifices 8 and the trailing pair of exhaust ejection orifices 9. Collectively, the exhaust ejection orifices 8, 9, 10 may be located at the edges of the footprint of engine exhaust 20 (FIG. 17) which is emitted from the engine cowling 28 during operation of the aircraft 24. Therefore, as further shown in FIGS. 8, 9 and 10, in some embodiments the middle pair of exhaust ejection orifices 10 may be closer to the respective flap side edges 5 than the respective proximal pair of exhaust ejection orifices 8 and the trailing pair of exhaust ejection orifices 9 may be closer to the respective flap side edges 5 than the middle pair of exhaust ejection orifices 10. It is to be understood that any number of pairs of the exhaust ejection orifices may be provided in the propulsion flap 2. As shown in FIG. 8, in some embodiments the propulsion flap 2 may be spaced-apart from the cowling outlet 29 of the cowling 28. As shown in FIG. 9, in other embodiments the propulsion flap 2 may extend into the cowling outlet 29 of the cowling 28.

Figure 11:
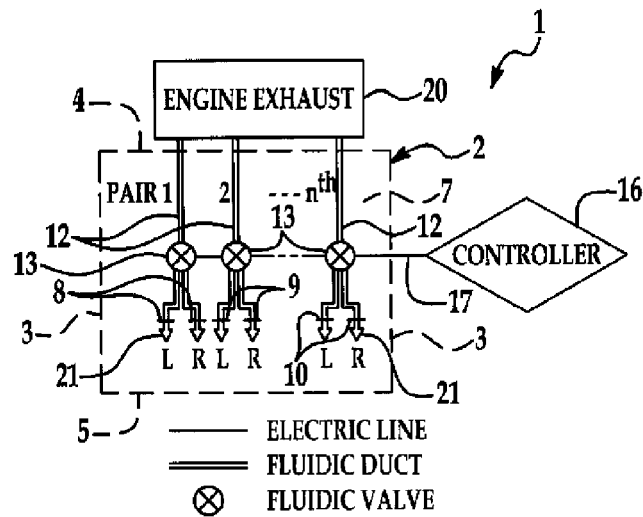
FIG. 11 is a schematic diagram of an illustrative embodiment of the propulsion system for efficient lift generation.

The exhaust ejection orifices 8, 9, 10 may be disposed in fluid communication with the cowling outlet 29 of the engine cowling 28. As shown in FIG. 11, in some embodiments an exhaust duct 12 may establish fluid communication between the cowling outlet 29 and each pair of exhaust ejection orifice 8, 9, 10. The exhaust ducts 12 may be embedded in or extend along a surface of the propulsion flap 2. Accordingly, as will be hereinafter further described, a fraction 21 (FIG. 11) of engine exhaust 20 which is emitted from the cowling outlet 29 of the engine cowling 28 may be distributed through the exhaust ducts 12 and ejected from each pair of exhaust ejection orifices 8, 9, 10. An exhaust flow valve 13 may be provided in each exhaust duct 12 to control flow of the engine exhaust 20 from the cowling outlet 29 of the engine cowling 28 to the exhaust ejection orifices 8, 9, 10. A controller 16 may be connected to the exhaust flow valves 13 through a suitable electrical connection 17.

In operation of the propulsion system 1, the controller 16 (FIG. 11) may be operated to open the exhaust flow valves 13 and discharge a fraction 21 of the engine exhaust 20 through each pair of exhaust ejection orifices 8, 9, 10 and along the exhaust flow surface 7 of the propulsion flap 2 to enhance lift particularly during takeoff, approach and landing of the aircraft 24. In some applications, the controller 16 may be preprogrammed according to flight conditions. The controller 16 may govern the actuation modes at the individual exhaust ejection orifices 8, 9, 10 in a time-varying fashion for optimum aerodynamic performance during flight of the aircraft 24.

Figure 12:
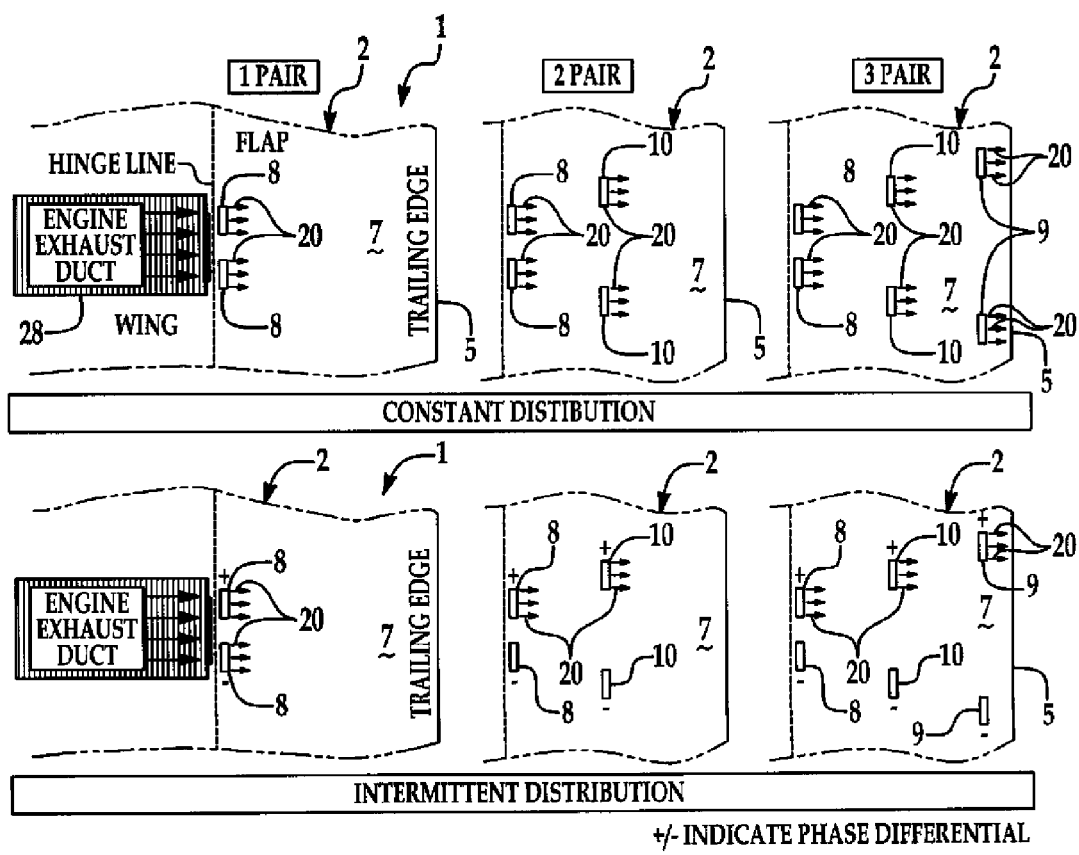
FIG. 12 is a schematic diagram which illustrates implementation of an illustrative embodiment of the propulsion system for efficient lift generation in a constant distribution mode and an intermittent distribution mode.

Modes of actuation of the propulsion system 1 are shown in FIG. 12. From left to right in FIG. 12 a single pair, two pairs and three pairs of exhaust ejection orifices 8, 9, 10, respectively, are illustrated in top view in a constant distribution mode (upper depiction) and in an intermittent distribution mode (lower depiction). During actuation of the propulsion system 1 the three pairs configuration of the exhaust ejection orifices 8, 9, 10 affects flow of the engine exhaust 20 over the entire exhaust flow surface 7 of the propulsion flap 2. The constant distribution mode of the upper depiction in FIG. 12 illustrates constant ejection of the engine exhaust 20 from the proximal exhaust ejection orifices 8, the trailing exhaust ejection orifices 9 and the middle exhaust ejection orifices 10. The intermittent distribution mode of the lower depiction in FIG. 12 illustrates a set of preferred modes of actuation in which ejection of the engine exhaust 20 from the exhaust ejection orifices 8, 9, 10 is generated in an intermittent fashion. When the exhaust ejection orifices 8, 9, 10 on one side of the propulsion flap 2 are operational their counterparts on the opposite side of the propulsion flap 2 are shut off, and vice versa. In FIG. 12, the operational exhaust ejection orifices 8, 9, 10 are indicated by a positive (+) sign and the shut off exhaust ejection orifices 8, 9, 10 are indicated by a negative (−) sign. In some applications, the controller 16 may be programmed to operate the exhaust flow valves 13 in an intermittent distribution mode at a frequency of about 1~1000 Hz.

Figure 13:
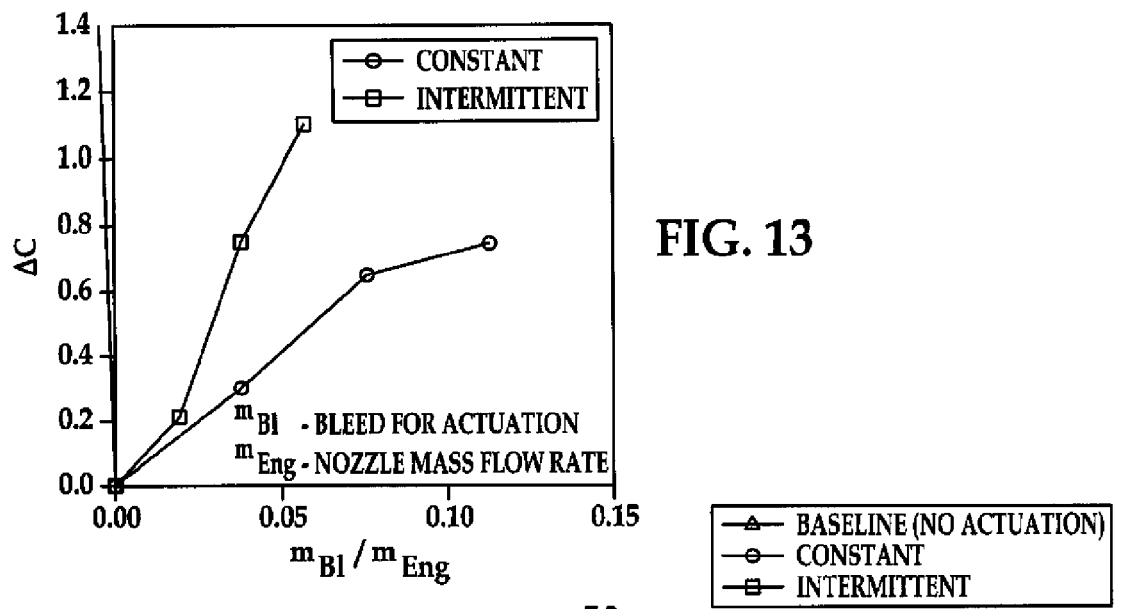
FIG. 13 is a graph which illustrates lift increments attained using various exhaust ejection orifice configurations as a function of time-averaged mass flow rate needed for actuation.

Referring next to FIG. 13, a graph which illustrates lift increments attained using various exhaust ejection orifice configurations as a function of time-averaged mass flow rate needed for actuation is shown. System performance is demonstrated for a typical wing segment which includes an engine and a deflected flap. The computational procedure is applied for representative takeoff condition of 65 knots and angle of attack of 10 degrees. Intermittent actuation (FIG. 12) of 5 Hz is used. FIG. 13 shows lift increments obtained with various configurations of the exhaust ejection orifices as a function of time-averaged mass flow rate needed for actuation. The bleed off of the engine is expressed in terms of fractional engine mass flow rate. Constant actuation is also shown for reference. The results indicate that intermittent actuation is very effective in producing higher lift with smaller mass flow rates. Additionally, at high increment levels, intermittent actuation produces nearly linear augmentation with increased engine speed, whereas constant blowing or ejection of exhaust from the exhaust ejection orifices exhibits diminishing lift gains.

To illustrate the advantages of intermittent actuation, specific observations are in order. Highest lift level of $\Delta C_L=1.1$ is achieved only with intermittent actuation using 5.6% engine bleed. In contrast, constant actuation using the same amount of bleed produces 0.47 lift gain, which translates to just 42% of that which is generated by intermittent actuation. Likewise, a lift increment of 0.75 is obtained with constant blowing or exhaust ejection using three pairs of exhaust ejection orifices and 11.2% engine bleed. Alternatively, intermittent actuation results in the same lift but utilizes only two pairs of exhaust ejection orifices with just 3.7% of engine bleed. This represents a 70% reduction in bleed level requirement.

Figure 14:
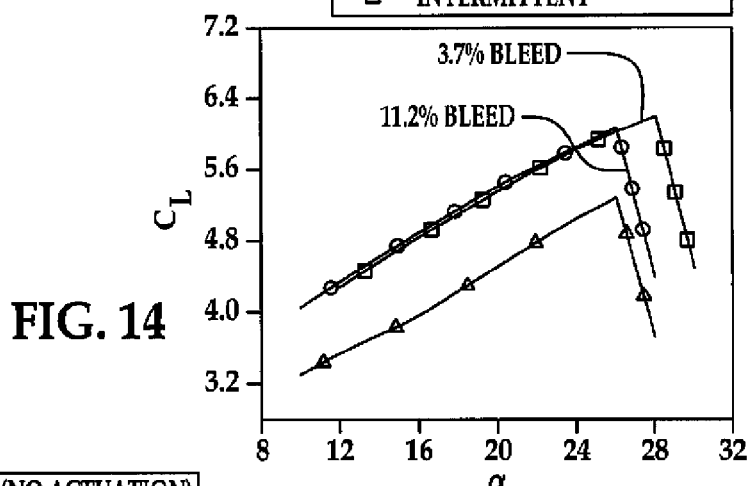
FIGS. 14 and 15 are graphs which illustrate the benefits of intermittent actuation over the range of flow incidence in implementation of an illustrative embodiment of the propulsion system for efficient lift generation.
Figure 15:
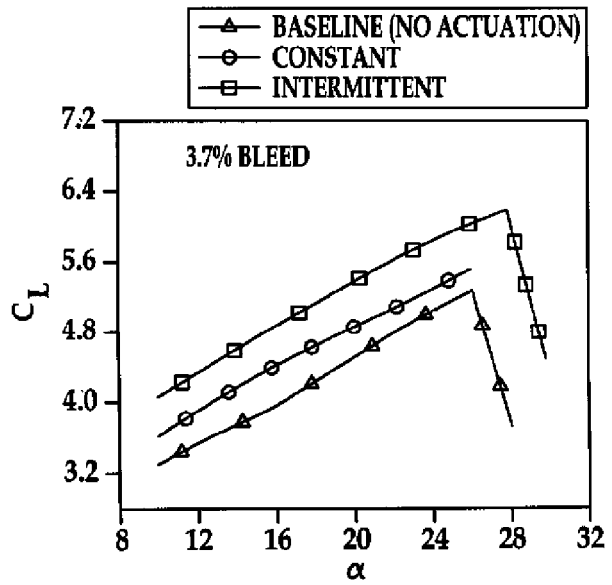

The benefits of intermittent actuation over the range of flow incidence are illustrated in the graph shown in FIG. 14. In the linear range the same lift as that which was produced by constant actuation can be achieved with intermittent blowing but using just 33% of engine bleed needed for constant actuation (3.7/11.2). Equivalently, using the same amount of engine bleed, intermittent actuation provides 2.4 times the lift increment achieved with constant actuation as shown in FIG. 15. Moreover, higher $C_{L\ Max}$ is achievable with unsteady actuation.

The efficiencies which are obtained with different actuation modes are expressed in the graph of FIG. 16 in terms of unit lift increment per unit of engine bleed. Time-varying actuation is approximately 3 times more efficient than constant actuation in the relevant range of flow incidence. This efficiency underscores the key advantage of this propulsion system. It is a result of the combined effects of (a) intermittent injection of high-momentum flow of engine exhaust which enhances the Coanda effect and (b) the use of 50% duty cycle at each exhaust ejection orifice.

Referring next to FIGS. 17A and 17B, the flow structure of an engine exhaust plume 20 around the high lift system is shown in a baseline configuration in FIG. 17A and an intermittent 3-pair port actuation configuration in FIG. 17B. As shown in FIG. 17A, without actuation of the propulsion system 1, the Coanda effect is hampered due to the quick rollup of the edge vortices of the engine exhaust plume 20. This leads to premature peeling of the vortices off the flap surface. Consequently, flow separation ensues over a large portion of the flap, resulting in significant lift degradation. The flow is by and large separated even in the flap region under the engine exhaust plume 20.

As shown in FIG. 17B, intermittent actuation of the propulsion system 1 profoundly affects the flow of the engine exhaust plume 20 by preventing flow separation over a sizeable span segment. The engine exhaust plume 20 attaches to the flap over a wider domain and effectively alters the original cross-sectional shape of the engine exhaust plume 20 into an elongated shape. The flow around the flap is much more streamlined, resulting in higher circulation and increased lift.

Referring next to FIG. 18, a flow diagram 1700 which illustrates an illustrative embodiment of the propulsion method for efficient lift generation is shown. In block 1702, a propulsion flap having a convex exhaust flow surface and exhaust ejection orifices in the exhaust flow surface on first and second sides of the propulsion flap is provided. The propulsion flap may be provided generally aft or downstream of the cowling outlet of an aircraft engine cowling provided on an aircraft wing of an aircraft. In some embodiments, the propulsion flap may be integral to the rear wing flap of the aircraft. In block 1704, a flow of engine exhaust is provided. In block 1706, a fraction of engine exhaust is discharged through the exhaust ejection orifices on the first and second sides of the propulsion flap. In some embodiments, the engine exhaust may be intermittently or alternately discharged through the exhaust ejection orifices on the first and second sides of the propulsion flap at a frequency of about 1~1000 Hz. In some embodiments, the engine exhaust may be discharged through the exhaust ejection orifices in a constant stream.

Figure 19:
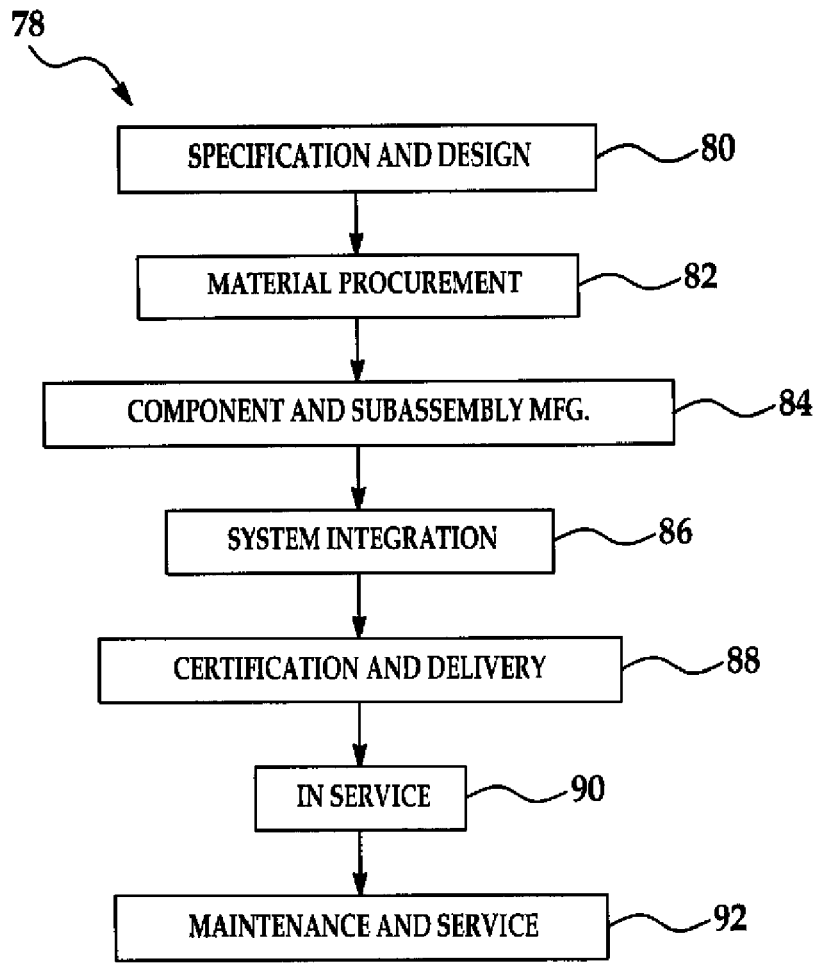
FIG. 19 is a flow diagram of an aircraft production and service methodology.
Figure 20:
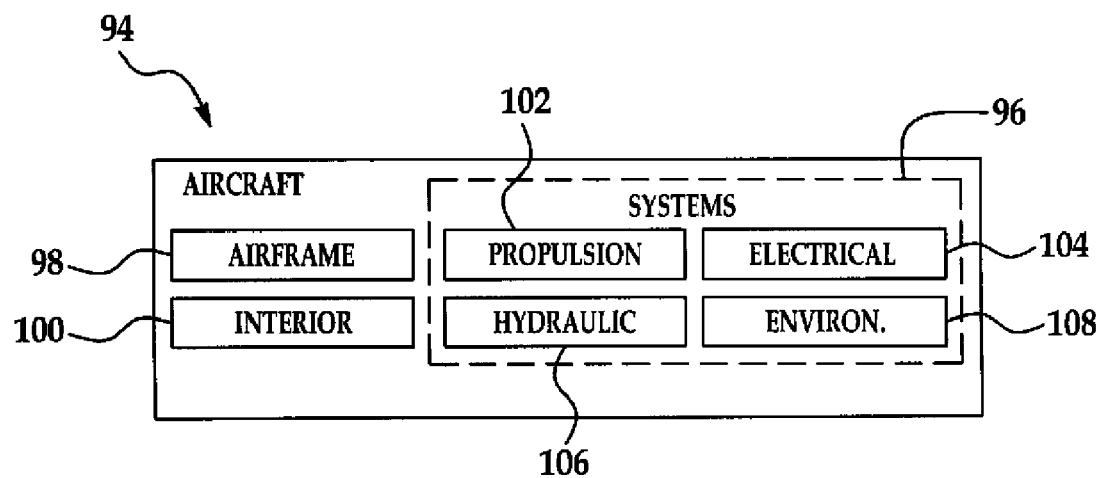
FIG. 20 is a block diagram of an aircraft.

Referring next to FIGS. 19 and 20, embodiments of the disclosure may be used in the context of an aircraft manufacturing and service method 78 as shown in FIG. 19 and an aircraft 94 as shown in FIG. 20. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A propulsion system for an aircraft, comprising:
   an airfoil;
   an engine having an engine cowling carried by the airfoil and configured to produce exhaust gases that are predominantly directed toward an aft end of the airfoil by the engine cowling as engine exhaust;
   a propulsion flap carried by the airfoil and disposed aft of the engine cowling;
   an extendable airfoil flap extending from the airfoil and wherein the propulsion flap extends from the airfoil flap; and
   a plurality of exhaust ejection orifices provided in the propulsion flap and adapted to receive at least a portion of the exhaust gases from the engine cowling.

2. The propulsion system of claim 1 further comprising a controller configured to switchably allow the at least a portion of the exhaust gases to pass through the plurality of exhaust ejection orifices in a constant distribution mode.

3. The propulsion system of claim 2 wherein the controller is further configured to switchably allow the at least a portion of the exhaust gases to pass through the plurality of exhaust ejection orifices in an intermittent distribution mode.

4. The propulsion system of claim 1 further comprising at least one duct extending through the propulsion flap and disposed in fluid communication with the engine cowling and the plurality of exhaust ejection orifices.

5. The propulsion system of claim 4 further comprising at least one exhaust flow valve provided in the at least one duct and a controller connected to the at least one exhaust flow valve.

6. The propulsion system of claim 1 wherein the propulsion flap has a generally rectangular shape.

7. The propulsion system of claim 6 wherein the propulsion flap has a flap hinge line connecting the propulsion flap to the airfoil, a pair of spaced-apart flap side edges extending from the flap hinge line, a flap trailing edge spaced-apart from the flap hinge line and a flap curvature between the flap hinge line and the flap trailing edge.

8. The propulsion system of claim 4 wherein the plurality of exhaust ejection orifices comprises a plurality of pairs of Spaced-apart exhaust ejection orifices.

9. The propulsion system of claim 8 wherein the plurality of pairs of exhaust ejection orifices comprises a pair of spaced-apart proximal exhaust ejection orifices generally adjacent to the flap hinge line, a pair of spaced-apart trailing exhaust ejection orifices generally adjacent to the flap trailing edge and a pair of spaced-apart middle exhaust ejection orifices between the proximal exhaust ejection orifices and the trailing exhaust ejection orifices.

10. A propulsion system configured for providing lift to an aircraft, comprising:
    an airfoil;
    an engine having an engine cowling carried by the airfoil and configured to produce exhaust gases that are predominantly directed toward an aft end of the airfoil by the engine cowling as engine exhaust;
    a generally rectangular propulsion flap carried by the airfoil and disposed aft of the engine cowling;
    an extendable airfoil flap extending from the airfoil and wherein the propulsion flap extends from the airfoil flap;
    a plurality of pairs of spaced-apart exhaust ejection orifices provided in the propulsion flap and adapted to receive at least a portion of the exhaust gases from the engine cowling; and
    a controller configured to facilitate intermittent flow of the at least a portion of the exhaust gases from the plurality of pairs of exhaust ejection orifices.

11. The propulsion system of claim 10 further, comprising at least one duct extending through the propulsion flap and disposed in fluid communication with the engine cowling and the plurality of exhaust ejection orifices.

12. The propulsion system of claim 11 further comprising at least one exhaust flow valve provided in the at least one duct and a controller connected to the at least one exhaust flow valve.

13. The propulsion system of claim 10 wherein the propulsion flap has a generally rectangular shape having a flap hinge line connecting the propulsion flap to the airfoil, a pair of spaced-apart flap side edges extending from the flap hinge line, a flap trailing edge spaced-apart from the flap hinge line and a flap curvature between the flap hinge line and the flap trailing edge.

14. The propulsion system of claim 13 wherein the plurality of exhaust ejection orifices comprises a plurality of pairs of spaced-apart exhaust ejection orifices.

15. The propulsion system of claim 14 wherein the plurality of pairs of exhaust ejection orifices comprises a pair of spaced-apart proximal exhaust ejection orifices generally adjacent to the flap hinge line, a pair of spaced-apart trailing exhaust ejection orifices generally adjacent to the flap trailing edge and a pair of spaced-apart middle exhaust ejection orifices between the proximal exhaust ejection orifices and the trailing exhaust ejection orifices.

16. A method for increasing lift produced along a surface of an airfoil of an aircraft having an airfoil and an engine having an engine cowling provided on the airfoil, the method comprising:
- providing a propulsion flap having a generally convex exhaust flow surface generally aft of the engine cowling and a plurality of exhaust ejection orifices provided in the exhaust flow surface;
- extending an extendable airfoil flap from the airfoil, and extending the propulsion flap from the airfoil flap;
- operating the engine to thereby produce exhaust gases; and
- ejecting at least a portion of the exhaust gases through the exhaust ejection orifices of the propulsion flap.

17. The method of claim 16 wherein the providing a propulsion flap having a plurality of exhaust ejection orifices provided in the exhaust flow surface comprises providing a propulsion flap having a plurality of pairs of spaced-apart exhaust ejection orifices provided in the exhaust flow surface.

18. The method of claim 17 wherein ejecting at least a portion of the exhaust gases through the exhaust ejection orifices of the propulsion flap comprises intermittently ejecting at least a portion of the exhaust gases through the exhaust ejection orifices of the propulsion flap.

19. A propulsion system configured for providing lift to an aircraft, comprising:
- an aircraft wing;
- an engine having an engine cowling carried by the aircraft wing and configured to produce exhaust gases that are predominantly directed toward an aft end of the aircraft wing by the engine cowling as engine exhaust;
- a rear wing flap extendable from the aircraft wing;
- a generally rectangular propulsion flap disposed aft of the engine cowling and having a flap hinge line extending along the rear wing flap, a pair of spaced-apart flap side edges extending from the flap hinge line, a flap trailing edge extending between the flap side edges, a flap curvature between the flap hinge line and the flap trailing edge and a convex exhaust flow surface defined by the flap curvature;
- a plurality of exhaust ducts embedded in the propulsion flap and disposed in fluid communication with the engine cowling;
- a plurality of exhaust flow valves communicating with the plurality of exhaust ducts, respectively;
- a pair of proximal exhaust ejection orifices, a pair of trailing exhaust ejection orifices and a pair of middle exhaust ejection orifices provided in the exhaust flow surface of the propulsion flap and disposed in fluid communication with the plurality of exhaust ducts; and
- a controller connected to the plurality of exhaust flow valves and configured to facilitate intermittent flow of at least a portion of the engine exhaust from the pair of proximal exhaust ejection orifices, the pair of trailing exhaust ejection orifices and the pair of middle exhaust ejection orifices.

20. A method for increasing lift produced along a surface of an aircraft wing of an aircraft having an aircraft wing, an engine having an engine cowling provided on the aircraft wing and a rear wing flap extendable from the aircraft wing, the method comprising:
- providing a propulsion flap generally aft of the engine cowling and comprising:
  - a flap hinge line extending along the rear wing flap;
  - a pair of spaced-apart flap side edges extending from the flap hinge line;
  - a flap trailing edge extending between the flap side edges;
  - a flap curvature between the flap hinge line and the flap trailing edge;
  - a convex exhaust flow surface defined by the flap curvature;
  - a plurality of pairs of exhaust ejection orifices provided in the exhaust flow surface;
  - a plurality of exhaust ducts embedded in the propulsion flap and establishing fluid communication between the engine cowling and the plurality of pairs of exhaust ejection orifices;
  - a plurality of exhaust flow valves communicating with the plurality of exhaust ducts, respectively; and
  - a controller connected to the plurality of exhaust flow valves;
- operating the engine to thereby produce exhaust gases; and
- operating the controller to intermittently eject at least a portion of the exhaust gases through the exhaust ejection orifices of the propulsion flap by actuation of the plurality of exhaust flow valves.

* * * * *